(12) United States Patent
Banerjee et al.

(10) Patent No.: US 12,547,502 B2
(45) Date of Patent: Feb. 10, 2026

(54) VERSION ROLLBACK FOR CLOUD-BASED APPLICATIONS

(71) Applicant: Capital One Services, LLC, McLean, VA (US)

(72) Inventors: Sayak Banerjee, Allen, TX (US); Tomas Anthony, Vancouver, WA (US); Theodore Timothy John, West Chester, PA (US); Sandeep Goli, Ashburn, VA (US); Milind Patel, Frisco, TX (US); Neeraja Desiraju, Plano, TX (US); Matthew Direnzo, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 25 days.

(21) Appl. No.: 18/780,000

(22) Filed: Jul. 22, 2024

(65) Prior Publication Data
US 2026/0023657 A1    Jan. 22, 2026

(51) Int. Cl.
*G06F 11/14*    (2006.01)
*G06F 11/1446*    (2026.01)

(52) U.S. Cl.
CPC ...... *G06F 11/1464* (2013.01); *G06F 11/1469* (2013.01); *G06F 2201/815* (2013.01)

(58) Field of Classification Search
CPC ............ G06F 11/1464; G06F 11/1469; G06F 2201/815
USPC ........................................................ 714/4.11
See application file for complete search history.

(56) References Cited

U.S. PATENT DOCUMENTS

| | | |
|---|---|---|
| 9,710,250 B2 | 7/2017 | Johnson et al. |
| 11,467,879 B2 | 10/2022 | Jablonski et al. |
| 11,487,530 B2 | 11/2022 | Suarez et al. |
| 2024/0184260 A1* | 6/2024 | Marrone ............ G05B 19/042 |

* cited by examiner

*Primary Examiner* — Yair Leibovich
(74) *Attorney, Agent, or Firm* — Harrity & Harrity, LLP

(57) ABSTRACT

In some implementations, a device may receive a request to roll back a cloud-based application to a previous version, where the cloud-based application is associated with a deployment type. The device may generate, in response to the request, a list of a plurality of previously-deployed versions of the cloud-based application. The device may receive a rollback request indicating a selection of a previously-deployed version, of the plurality of previously-deployed versions, of the cloud-based application. The device may perform one or more rollback actions to roll back the cloud-based application to the previously-deployed version, where the one or more rollback actions are in accordance with the deployment type associated with the cloud-based application.

20 Claims, 10 Drawing Sheets

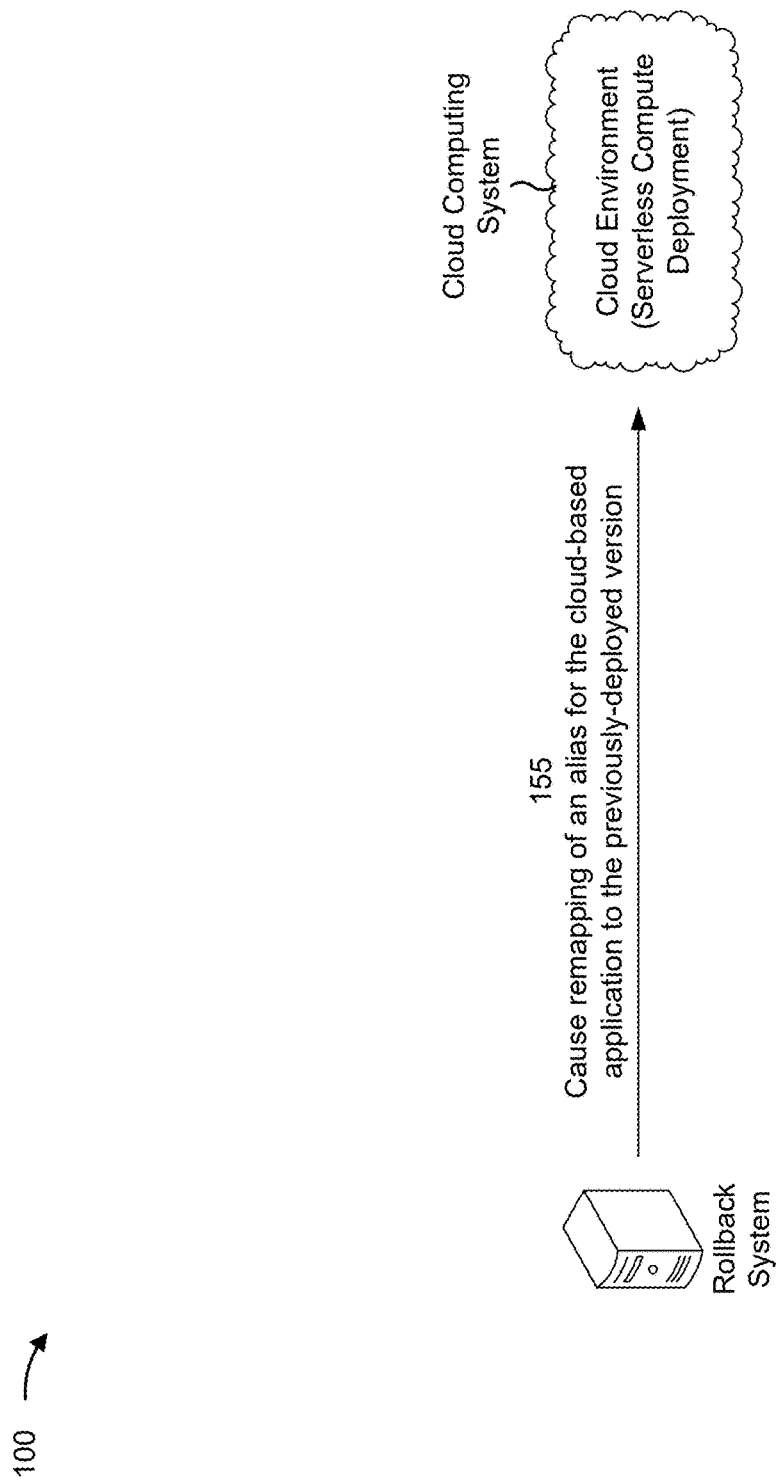

VERSION ROLLBACK FOR CLOUD-BASED APPLICATIONS

BACKGROUND

Software deployment includes activities necessary to make a software system or application (e.g., that implements a service) available for use. Software deployment may include development, testing, updating, activation, or the like. Software deployment may include multiple iterations, and/or may include various environments, frameworks, and/or hardware configurations.

SUMMARY

Some implementations described herein relate to a system for version rollback for cloud-based applications. The system may include one or more memories and one or more processors communicatively coupled to the one or more memories. The one or more processors may be configured to receive a request, made via a user interface, to roll back a cloud-based application to a previous version, where the cloud-based application is associated with a deployment type. The one or more processors may be configured to generate, in response to the request and for presentation in the user interface, a list of a plurality of previously-deployed versions of the cloud-based application. The one or more processors may be configured to receive, via the user interface, a rollback request indicating a selection of a previously-deployed version, of the plurality of previously-deployed versions, of the cloud-based application. The one or more processors may be configured to iteratively scan, responsive to the deployment type being a container deployment, respective deployment specifications for a plurality of previous deployments of the cloud-based application to identify image versions referenced in the respective deployment specifications. The one or more processors may be configured to identify, while iteratively scanning, an inactive deployment specification, of the respective deployment specifications, that references an image version for the previously-deployed version of the cloud-based application. The one or more processors may be configured to generate a new deployment specification using a content of the inactive deployment specification. The one or more processors may be configured to cause a deployment of the cloud-based application using the new deployment specification.

Some implementations described herein relate to a method of version rollback for cloud-based applications. The method may include receiving a request to roll back a cloud-based application to a previous version. The method may include generating, in response to the request, a list of a plurality of previously-deployed versions of the cloud-based application. The method may include receiving a rollback request indicating a selection of a previously-deployed version, of the plurality of previously-deployed versions, of the cloud-based application. The method may include identifying an inactive deployment specification, from among a plurality of deployment specifications for the cloud-based application, that references an image version for the previously-deployed version of the cloud-based application. The method may include generating a new deployment specification using a content of the inactive deployment specification. The method may include causing a deployment of the cloud-based application using the new deployment specification.

Some implementations described herein relate to a non-transitory computer-readable medium that stores a set of instructions for version rollback for cloud-based applications. The set of instructions, when executed by one or more processors of a device, may cause the device to receive a request to roll back a cloud-based application to a previous version, where the cloud-based application is associated with a deployment type. The set of instructions, when executed by one or more processors of the device, may cause the device to generate, in response to the request, a list of a plurality of previously-deployed versions of the cloud-based application. The set of instructions, when executed by one or more processors of the device, may cause the device to receive a rollback request indicating a selection of a previously-deployed version, of the plurality of previously-deployed versions, of the cloud-based application. The set of instructions, when executed by one or more processors of the device, may cause the device to perform one or more rollback actions to roll back the cloud-based application to the previously-deployed version, wherein the one or more rollback actions are in accordance with the deployment type associated with the cloud-based application.

BRIEF DESCRIPTION OF THE DRAWINGS

FIGS. 1A-1G are diagrams of an example associated with version rollback for cloud-based applications, in accordance with some embodiments of the present disclosure.

DETAILED DESCRIPTION

Figure 1A:
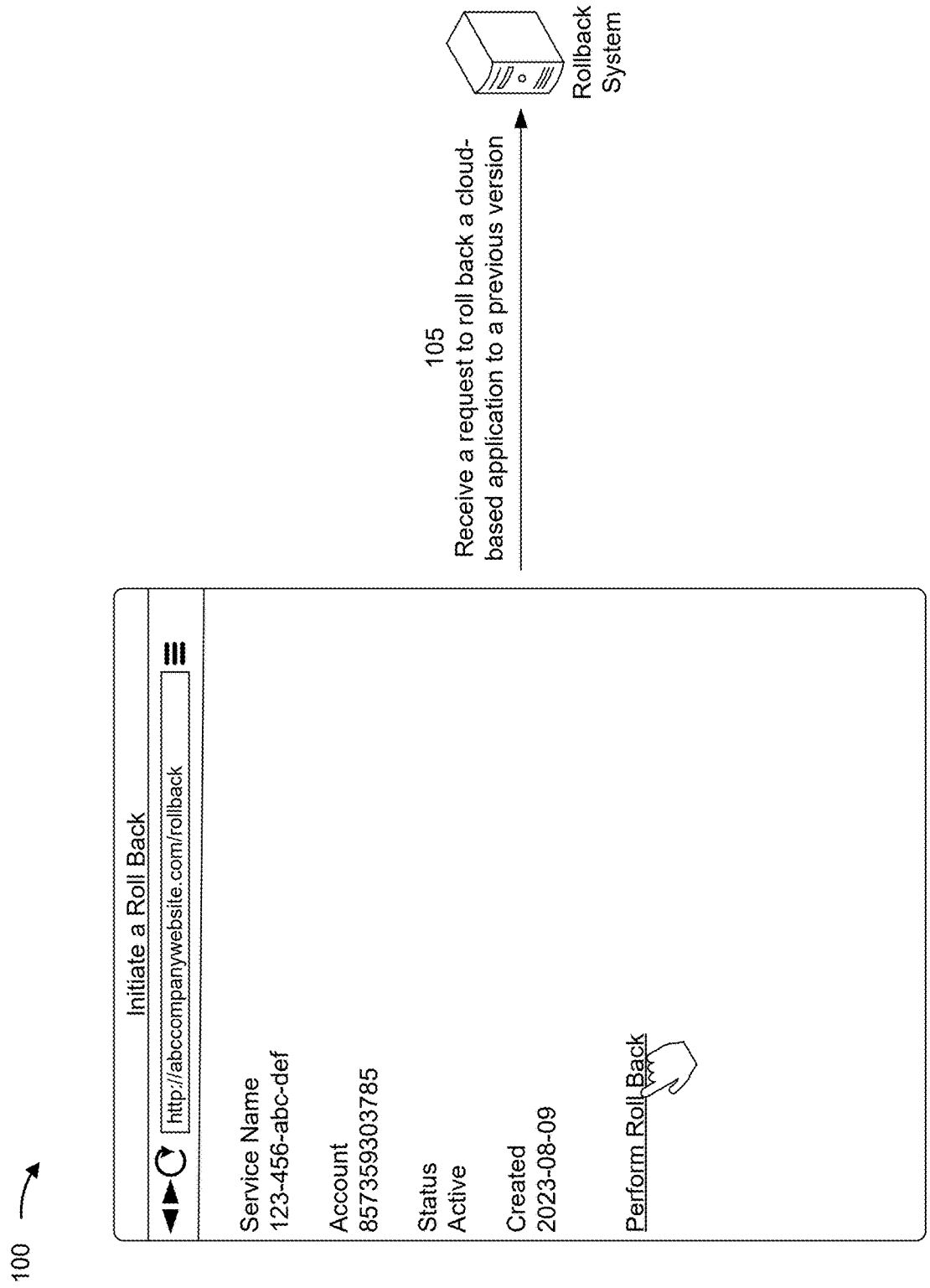

The following detailed description of example implementations refers to the accompanying drawings. The same reference numbers in different drawings may identify the same or similar elements.

Cloud computing services offer enhanced scalability and flexibility for applications deployed in cloud computing environments. Containerization and serverless computing further extend the benefits of cloud computing by enabling highly efficient resource utilization and infrastructure management. Containers provide lightweight, portable environments for applications to maintain consistency across different deployment environments. Serverless computing enables code to be run in response to events without provisioning or managing servers.

Applications may be frequently updated to introduce new features and/or bug fixes. However, changes to an application's code and/or configuration can sometimes produce issues. For instance, code updates may introduce bugs or vulnerabilities that compromise application functionality or security. Configuration updates may inadvertently expose sensitive data or disrupt crucial services. Furthermore, incompatible updates can lead to conflicts with dependencies or infrastructure components, resulting in unexpected downtime or performance degradation. In situations where a recent code or configuration update for an application results in defects, it may be desirable to roll back the application to a previous stable version. However, the task of rolling back an application to a previous version may be slow, leading to significant service degradation or disruption. For example, continuous integration and continuous delivery (CI/CD) tools typically used to deploy applications may lack the responsiveness and agility needed for fast and efficient rollback.

Some implementations described herein enable fast and efficient rollback of an application to a previous stable version. Furthermore, implementations described herein enable rollback for multiple different types of cloud deployments (e.g., container deployments or serverless compute deployments, among other examples). In some implementations, a rollback system may provide a user interface to allow a user to initiate a rollback for an application and to select a previous version of the application for the rollback. The rollback system may perform rollback actions in accordance with a deployment type for the application.

For example, for a container deployment, the rollback system may iteratively scan deployment specifications (e.g., task definitions) for previous deployments of the application until identifying a deployment specification that references a container image version associated with the selected previous version. The deployment specification may be inactive (e.g., the previous version of the application that the deployment specification relates to is not currently running). Accordingly, the rollback system may generate a new deployment specification using a content of the inactive deployment specification, and may cause deployment of the cloud-based application using the new deployment specification. Because the selected previous version is a stable version of the application, the deployment may use an "all-at-once" strategy (e.g., concurrent stopping of all existing instances of the application, followed by a deployment wave where each new instance is initiated without waiting for the previous instance to become healthy), thereby achieving a fast rollback to the selected previous version.

Through quick and efficient rollback, service degradation or disruption associated with changes to an application's code or configuration can be minimized. Accordingly, techniques described herein may provide improved application functionality and security. Moreover, techniques described herein may provide reduced application downtime and faster resolution of conflicts due to code or configuration changes.

FIGS. 1A-1G are diagrams of an example 100 associated with version rollback for cloud-based applications. As shown in FIGS. 1A-1G, example 100 includes a rollback system, a release management system, a data store, a version control system, and a cloud computing system. These devices are described in more detail in connection with FIGS. 2 and 3.

The rollback system may be associated with an entity involved in the development and deployment of software applications. For example, the entity may provide end-user-facing applications, such as one or more web sites. The rollback system may include a front end and a back end. The front end may provide a user interface through which users can initiate rollback requests. For example, the user interface may be provided by a web server of the rollback system. The release management system, the data store, and the version control system may be managed and/or used by the entity in connection with maintaining current and historical data and files relating to application releases from the entity. The data store may store container image versions relating to one or more applications of the entity. The version control system may store codebases relating to the one or more applications.

The cloud computing system may be associated with a cloud computing service provider. The entity may deploy applications in a cloud environment of the cloud computing system.

As shown in FIG. 1A, and by reference number 105, the rollback system may receive a request to roll back (e.g., revert) a cloud-based application to a previous version. For example, the request may be made by a user (e.g., a software developer) via the user interface (e.g., via a web page). The request may be made in response to an incident (e.g., a bug, an instability, a service interruption, or the like) affecting a currently-deployed version of the cloud-based application. For example, the incident may result from a change to the code and/or configuration for the cloud-based application.

The cloud-based application may be deployed in a cloud environment. The cloud-based application may be associated with a deployment type. As one example, the deployment type may be a container deployment (e.g., using a container service of the cloud environment). For example, the cloud-based application may use a container (e.g., a self-contained software package that includes code, runtime, libraries, and dependencies). In some implementations, the container deployment may use user-managed compute resources (e.g., one or more user-managed virtual machines). Alternatively, the container deployment may use service-managed compute resources (e.g., compute resources managed by a service of the cloud environment). As another example, the deployment type may be a serverless compute deployment. For example, the cloud-based application may be a serverless function (e.g., code that is executable in response to an event and without the need to provision a server for the code). In some implementations, the application may be non-cloud based (e.g., an application deployed on on-premises infrastructure).

In some implementations, at least one additional cloud-based application may be deployed in the cloud environment with the cloud-based application (e.g., where both the cloud-based application and the additional cloud-based application are managed by the entity). For example, the additional cloud-based application may be associated with a different deployment type than the deployment type associated with the cloud-based application. In particular, multiple cloud-based applications (e.g., that are managed by the entity) may be deployed in the cloud environment, and each cloud-based application may be associated with a respective deployment type (e.g., either a container deployment or a serverless compute deployment).

Figure 1B:
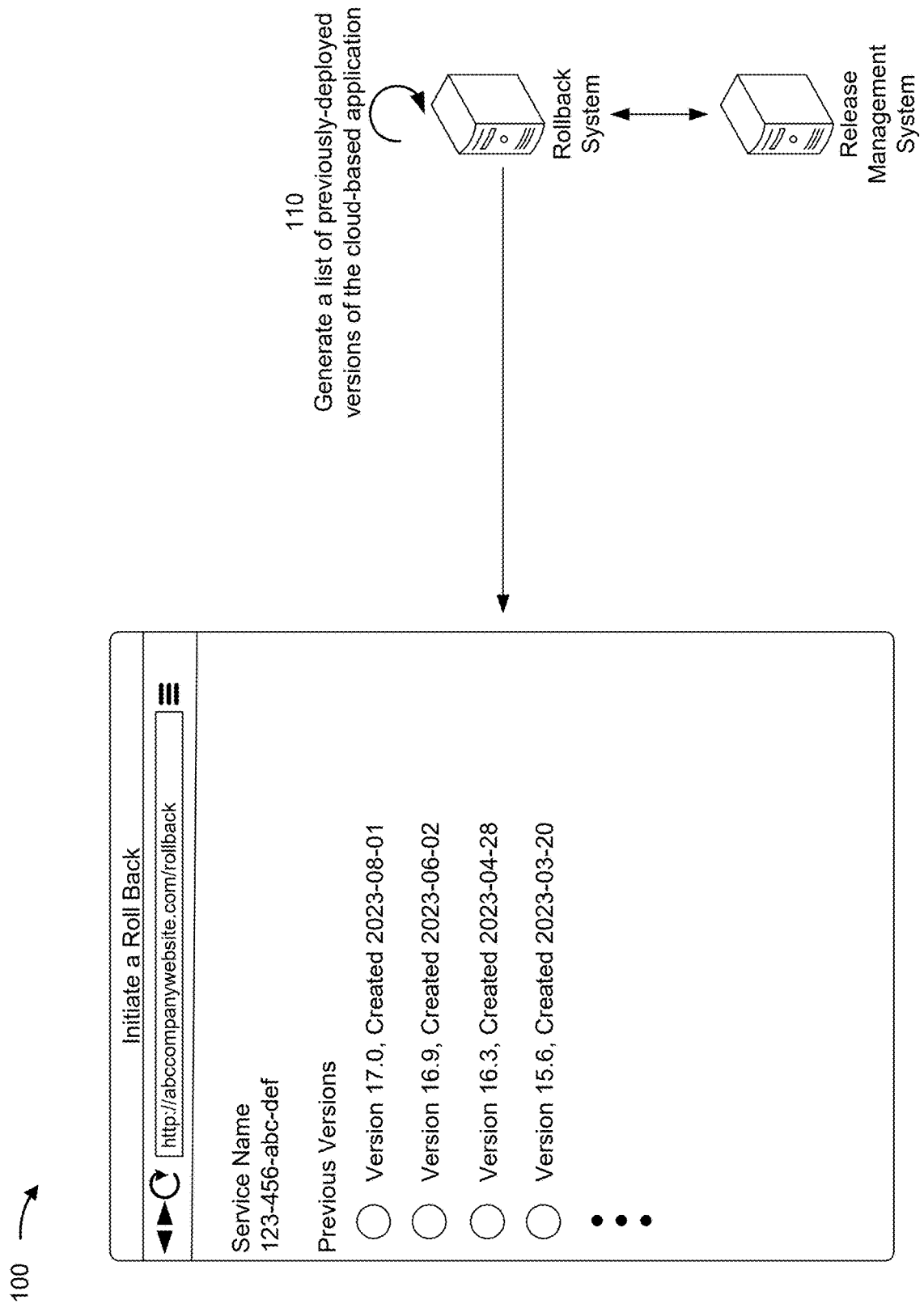

As shown in FIG. 1B, and by reference number 110, the rollback system may generate, in response to the request, a list of a plurality of previously-deployed versions of the cloud-based application. For example, the rollback system may obtain information relating to previously-deployed versions of the cloud-based application from the release management system, and the rollback system may generate the list using the information. The rollback system may generate the list with the previously-deployed versions in chronological order (e.g., with a most-recent version at a top of the list). In some implementations, to generate the list, the rollback system may filter the list, to remove from the list unstable previously-deployed versions. The rollback system may identify any previously-deployed version from which a rollback was performed as an unstable version (e.g., historical rollback information may be stored by the rollback system, or may be obtained by the rollback system from the release management system).

The list of previously-deployed versions may be for presentation in the user interface. For example, the list of previously-deployed versions may be presented in the user interface using information relating to the previously-deployed versions, such as version numbers, release identifiers, release dates, version descriptions, or the like. Moreover, the list of previously-deployed versions may be presented in the user interface with input elements that enable the user to select one of the previously-deployed versions.

Figure 1C:
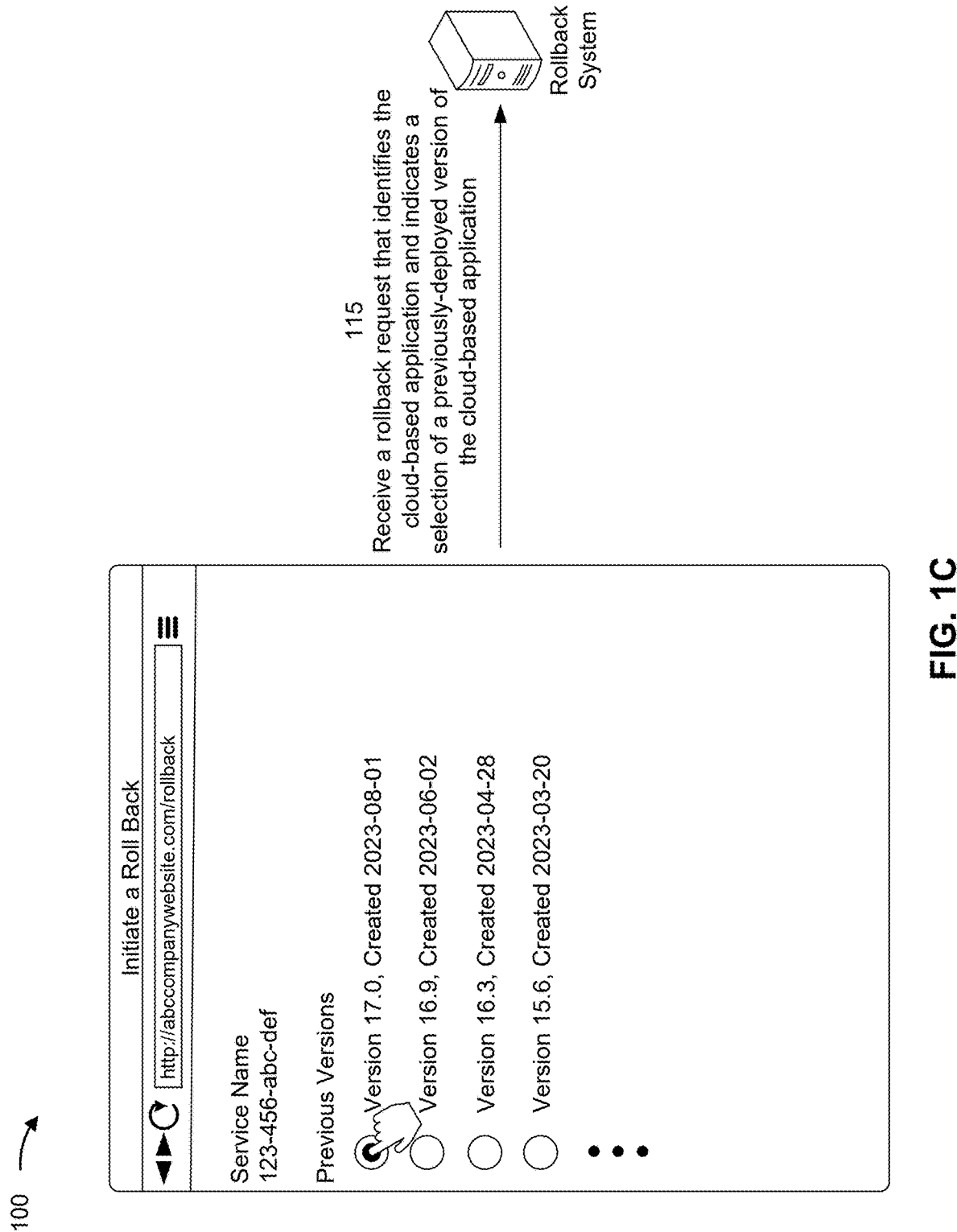

As shown in FIG. 1C, and by reference number 115, the rollback system may receive a rollback request that identifies the cloud-based application and indicates a selection of a previously-deployed version of the cloud-based application. For example, the selection may be made by the user via the user interface. In some implementations, the rollback request may be an application programming interface (API) request (e.g., from the web server of the rollback system) that is triggered by the selection of the previously-deployed version via the user interface. The rollback system (e.g., at the back end) may include an API system (e.g., implemented as one or more API containers) configured to listen for API requests. Accordingly, the rollback system, using the API system, may receive the API request indicating the selection of the previously-deployed version, and the rollback system may initiate the rollback in response to receiving the API request. The selected previously-deployed version of the cloud-based application may be inactive (e.g., not currently running).

In some implementations, in connection with initiating the rollback, the rollback system may authenticate into an account with the cloud environment (e.g., assume a role in an account for the cloud environment). The cloud-based application may be deployed in connection with the account (e.g., the cloud-based application may be managed under the account). To authenticate with the cloud environment, the rollback system may request (e.g., from the cloud environment) security credentials, receive the security credentials, and/or use the security credentials (e.g., an access key, a secret key, or the like) to perform operations for the account in the cloud environment.

Figure 1D:
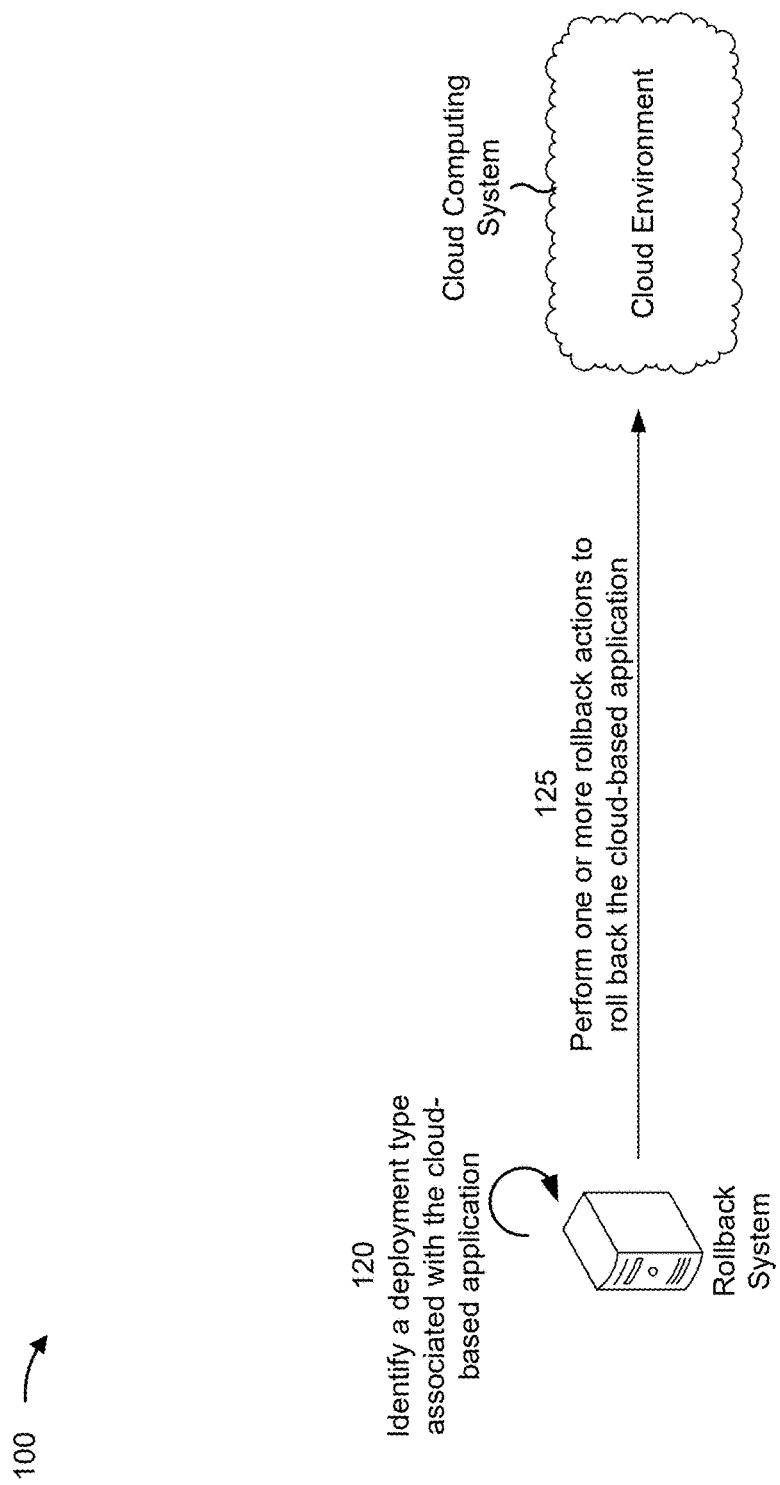

As shown in FIG. 1D, and by reference number 120, in response to the rollback request, the rollback system may identify a deployment type associated with the cloud-based application. For example, based on receiving the rollback request relating to the cloud-based application, the rollback system may identify a deployment type associated with the cloud-based application. In particular, the rollback system may identify whether a deployment type associated with the cloud-based application is a container deployment (and furthermore whether the container deployment uses user-managed compute resources or service-managed computer resources) or a serverless compute deployment.

As shown by reference number 125, the rollback system may perform one or more rollback actions to roll back the cloud-based application (e.g., to the previously-deployed version that was selected). The rollback action(s) that the rollback system performs may be in accordance with the deployment type associated with the cloud-based application. Thus, the rollback system provides rollback functionality across multiple different deployment types.

Figure 1E:
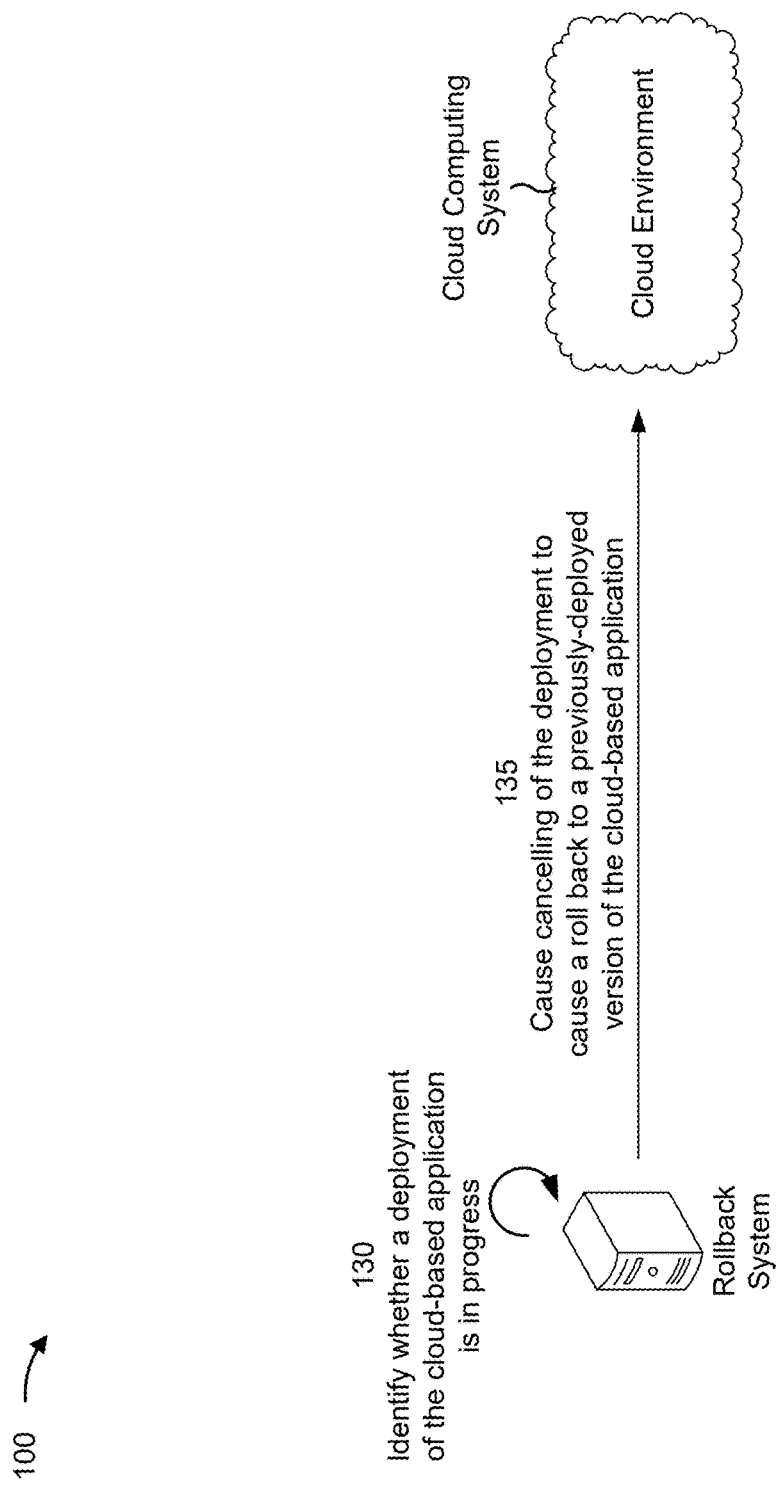

In some implementations, the rollback request may indicate a cancellation of an in-progress deployment of the cloud-based application (e.g., a rollback request to cancel an in-progress deployment may imply that the selected version is an immediately-preceding version), and the rollback system may perform rollback actions to handle the cancellation of the in-progress deployment of the cloud-based application, as shown in FIG. 1E, and by reference numbers 130 and 135. As shown by reference number 130, the rollback system may identify whether a deployment of the cloud-based application is in progress (e.g., whether the cloud-based application is currently ramping up an existing deployment). As shown by reference number 135, the rollback system may cause canceling of the deployment in order to cause a rollback to one of the previously-deployed versions of the cloud-based application (e.g., an immediately-preceding version, which may not be the selected version indicated in the rollback request). For example, the rollback system may stop the deployment that is in progress, which may automatically result in a rollback to one of the previously-deployed versions of the cloud-based application. If there is not an in-progress deployment, then the rollback system may perform rollback actions to roll back the cloud-based application to the selected version indicated in the rollback request.

Figure 1F:
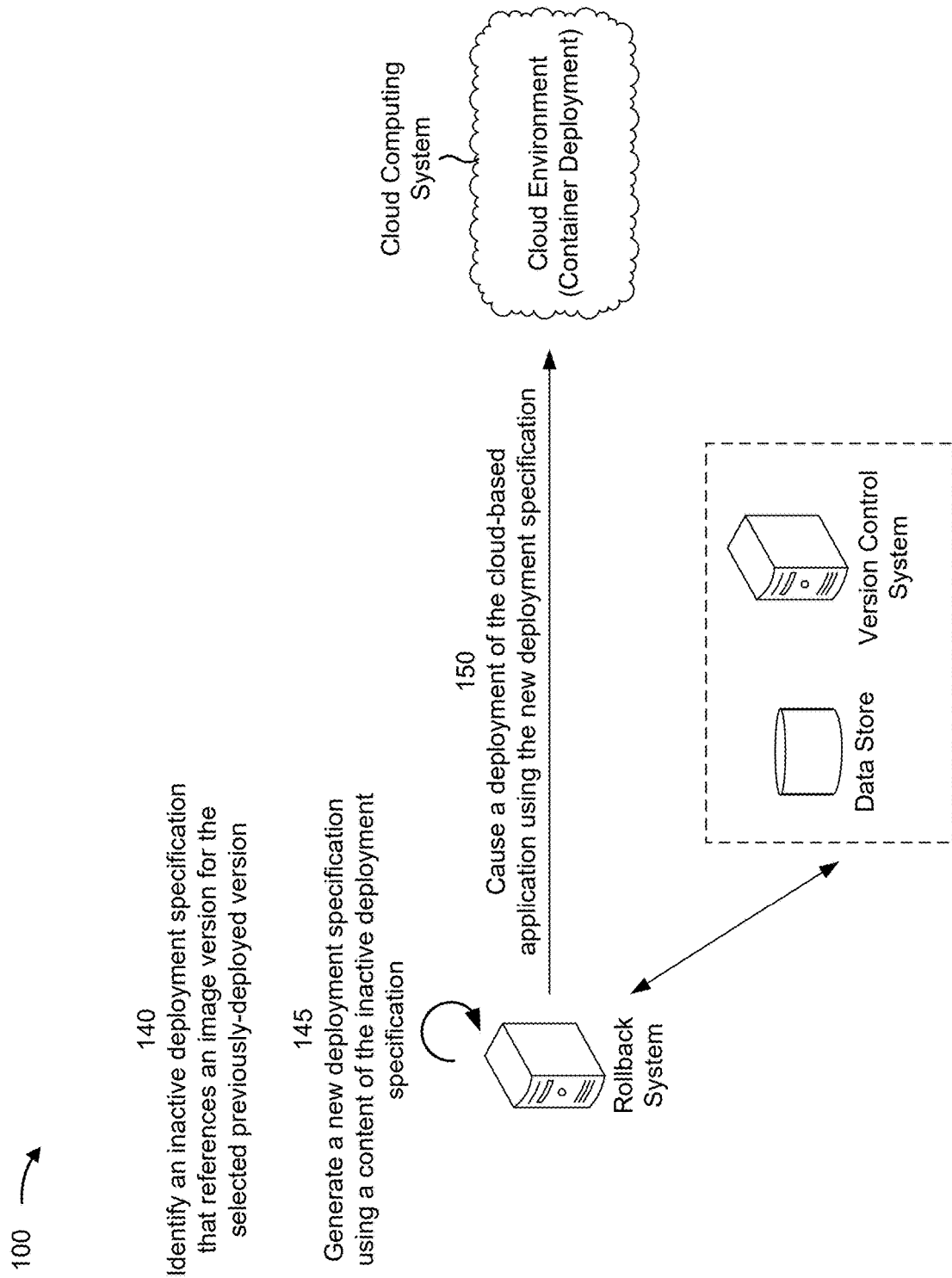

If the deployment type is a container deployment (e.g., the cloud-based application uses a container), then the rollback system may perform the rollback actions shown in FIG. 1F, and by reference numbers 140, 145, and 150, to roll back the cloud-based application to the selected version indicated in the rollback request. As shown by reference number 140, the rollback system may identify an inactive deployment specification (e.g., a previous deployment specification version), from among a plurality of deployment specifications for the cloud-based application, that references an image version (e.g., a container image version) for the selected previously-deployed version of the cloud-based application. The inactive deployment specification may be considered inactive because it is associated with a previously-deployed version of the cloud-based application that is not currently running. In some implementations, the rollback system may identify the image version associated with the previously-deployed version of the cloud-based application using a mapping (e.g., stored by the rollback system, or obtained by the rollback system from the release management system). A deployment specification may sometimes be referred to as a "task definition" or an "application specification."

To identify the inactive deployment specification, the rollback system may iteratively scan respective deployment specifications for a plurality of previous deployments (e.g., code deployments) of the cloud-based application to identify image versions referenced in the respective deployment specifications. Thus, the rollback system may identify, while iteratively scanning, the inactive deployment specification that references the image version for the selected previously-deployed version of the cloud-based application. The rollback system may discontinue iteratively scanning the respective deployment specifications responsive to identifying the inactive deployment specification that references the image version.

As shown by reference number 145, the rollback system may generate a new deployment specification using a content of the inactive deployment specification. For example, if the deployment specification that is identified is inactive, then the rollback system may generate a new deployment specification using the details of the inactive deployment specification. The content of the inactive deployment specification may indicate the image version and one or more additional parameters relating to the container, such as a processor allocation for the container, a memory allocation for the container, a networking configuration for the container (e.g., a port mapping for the container to a host machine), one or more environment variables, and/or one or more data volumes for the container, among other examples.

As shown by reference number 150, the rollback system may cause a deployment of the cloud-based application, to the cloud environment, using the new deployment specification (e.g., by bringing up the selected previously-deployed version of the cloud-based application at runtime). In some implementations, the rollback system may cause the deployment without use of a CI/CD tool. For example, the rollback system may directly interact with the cloud environment (e.g., through authenticating with the cloud environment) to cause the deployment of the cloud-based application. In some implementations, the deployment of the cloud-based application may involve communications between the rollback system and the data store (e.g., to retrieve the image version) and/or between the rollback system and the version control system (e.g., to retrieve source code associated with the image version).

In some implementations, the rollback system may cause the deployment of the cloud-based application using an "all-at-once" strategy. For example, the rollback system may cause concurrent stopping of all existing instances of the cloud-based application, and cause initiation of new instances of the cloud-based application using the new deployment specification (e.g., in a deployment wave where each new instance is initiated without waiting for the previous instance to become healthy). The "all-at-once" strategy can be used for the deployment because the new deployment specification is based on a previous deployment specification associated with a known stable deployment of the cloud-based application. In this way, deployment of the cloud-based application may be achieved quickly, such as in 15 minutes or fewer.

If the deployment type is a serverless compute deployment (e.g., the cloud-based application is a serverless function), then the rollback system may perform the rollback action shown in FIG. 1G, and by reference number 155, to roll back the cloud-based application to the selected version indicated in the rollback request. As shown by reference number 155, the rollback system may cause remapping of an alias for the cloud-based application to the previously-deployed version of the cloud-based application. Accordingly, subsequent calls or references using the alias will invoke the previously-deployed version of the cloud-based application.

In some implementations, the rollback system may cause updating of information stored by the release management system and/or the version control system to indicate a successful rollback of the cloud-based application to the previously-deployed version (e.g., so that the release management system and/or the version control system is aware that the previously-deployed version is now currently deployed).

Through quick and efficient rollback, service degradation or disruption associated with changes to an application's code or configuration can be minimized. Accordingly, techniques described herein may provide improved application functionality and security. Moreover, techniques described herein may provide reduced application downtime and faster resolution of conflicts due to code or configuration changes.

As indicated above, FIGS. 1A-1G are provided as an example. Other examples may differ from what is described with regard to FIGS. 1A-1G.

Figure 2:
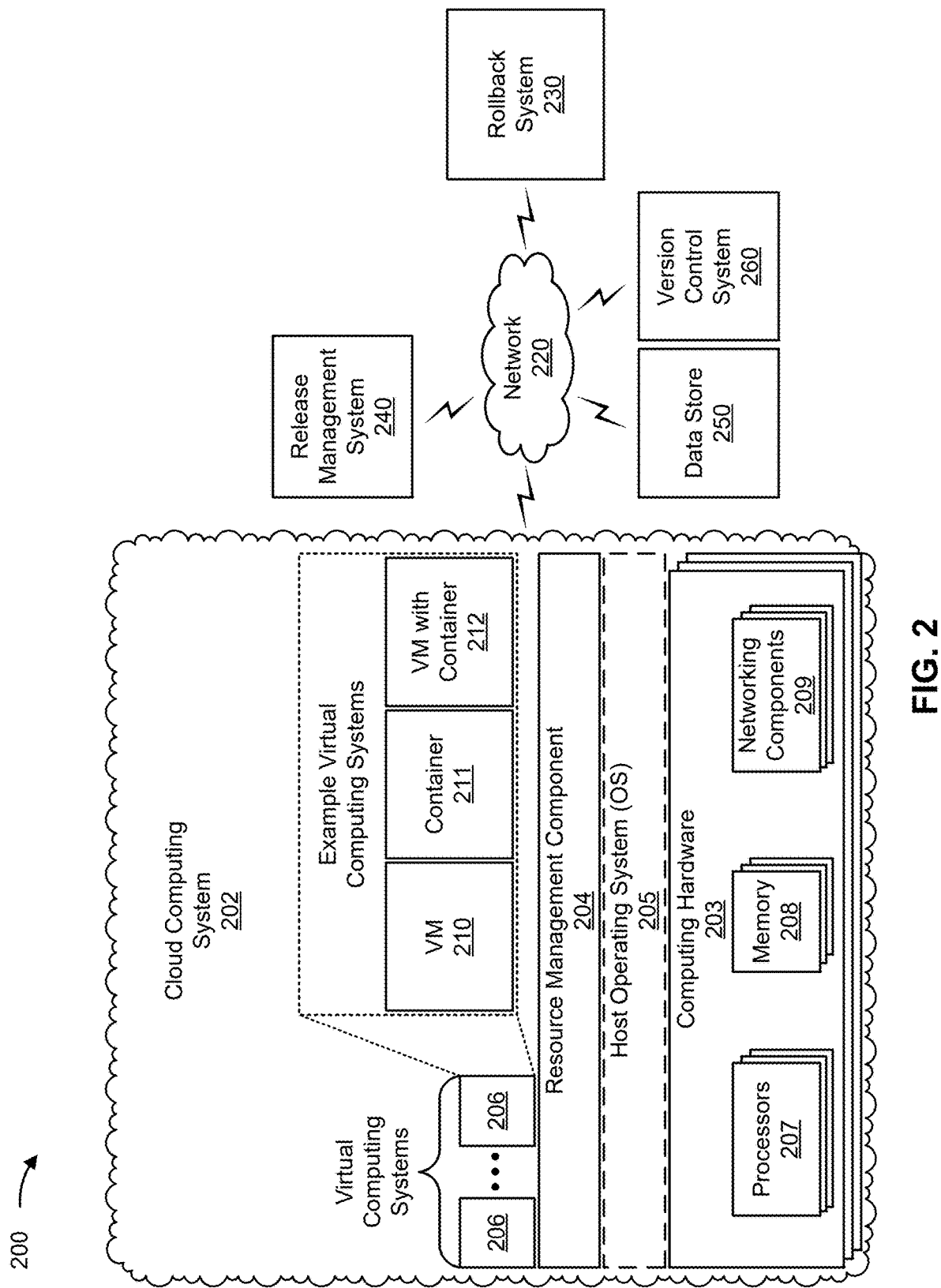
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a cloud computing system 202. The cloud computing system 202 may include one or more elements 203-212, as described in more detail below. As further shown in FIG. 2, environment 200 may include a network 220, a rollback system 230, a release management system 240, a data store 250, and/or a version control system 260. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications (e.g., the cloud-based application described herein) using a file system that includes binary files, software libraries, and/or other resources required to execute applications on a guest operating system (e.g., within the virtual computing system 206) or the host operating system 205.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The rollback system 230 may include one or more devices capable of receiving, generating, storing, processing, providing, and/or routing information associated with version rollback for applications, as described elsewhere herein. The rollback system 230 may include a communication device and/or a computing device. For example, the rollback system 230 may include a server, such as an application server, a client server, a web server, a database server, a host server, a proxy server, a virtual server (e.g., executing on computing hardware), or a server in a cloud computing system. In some implementations, the rollback system 230 may include computing hardware used in a cloud computing environment.

The release management system 240 may include one or more devices capable of receiving, generating, storing, processing, providing, and/or routing information associated with release management for one or more applications, as described elsewhere herein. The release management system 240 may include a communication device and/or a computing device. For example, the release management system 240 may include a server, such as an application server, a client server, a web server, a database server, a host server, a proxy server, a virtual server (e.g., executing on computing hardware), or a server in a cloud computing system. In some implementations, the release management system 240 may include computing hardware used in a cloud computing environment.

The data store 250 may include one or more devices capable of receiving, generating, storing, processing, and/or providing information associated with container image versions, as described elsewhere herein. The data store 250 may include a communication device and/or a computing device. For example, the data store 250 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data store 250 may store container images, as described elsewhere herein.

The version control system 260 may include one or more devices capable of receiving, generating, storing, processing, providing, and/or routing information associated with codebases for one or more applications, as described elsewhere herein. The version control system 260 may include a communication device and/or a computing device. For example, the version control system 260 may include a server, such as an application server, a client server, a web server, a database server, a host server, a proxy server, a virtual server (e.g., executing on computing hardware), or a server in a cloud computing system. In some implementations, the version control system 260 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
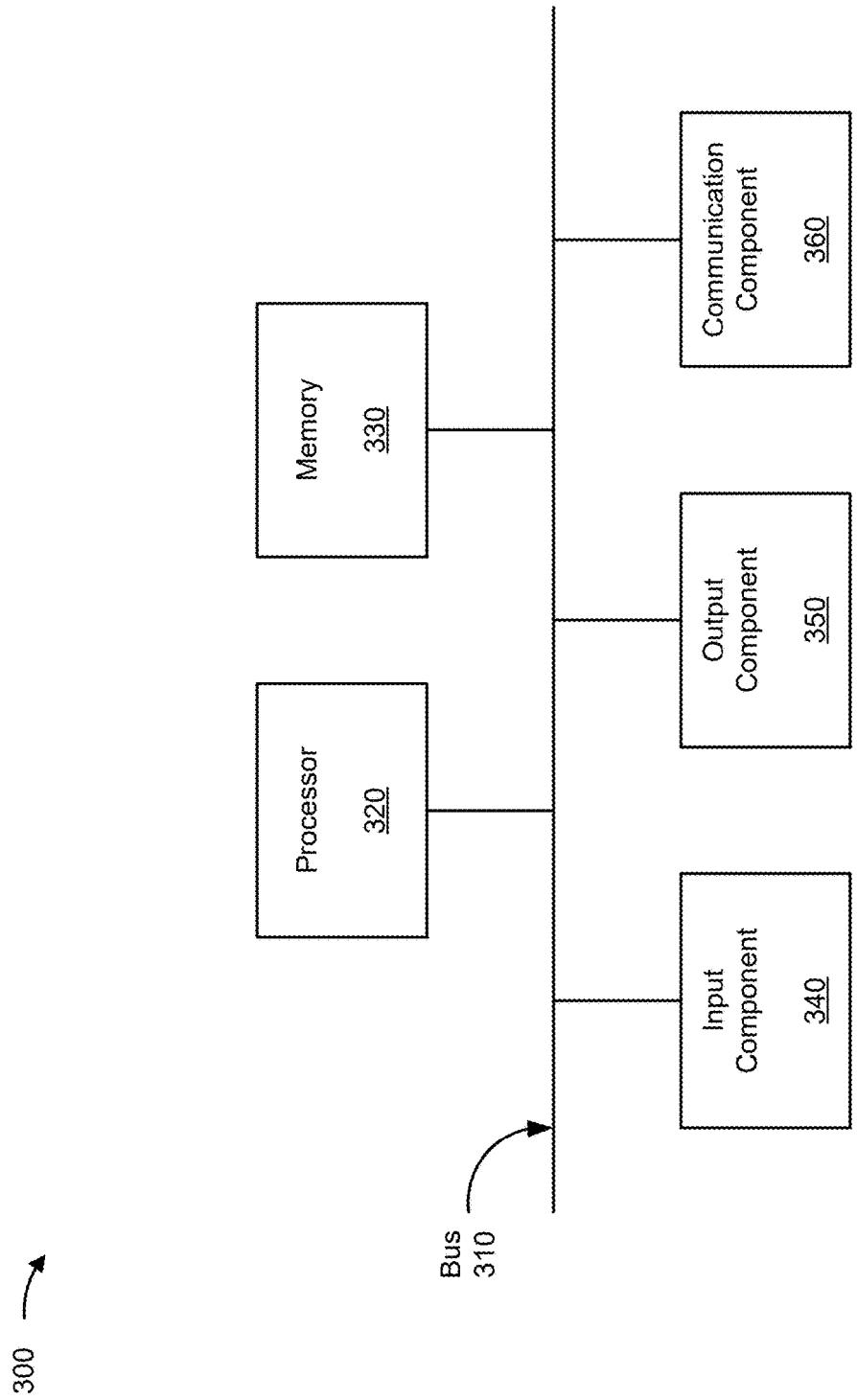
FIG. 3 is a diagram of example components of a device associated with version rollback for cloud-based applications, in accordance with some embodiments of the present disclosure.

FIG. 3 is a diagram of example components of a device 300 associated with version rollback for cloud-based applications. The device 300 may correspond to cloud computing system 202, rollback system 230, release management system 240, data store 250, and/or version control system 260. In some implementations, cloud computing system 202, rollback system 230, release management system 240, data store 250, and/or version control system 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
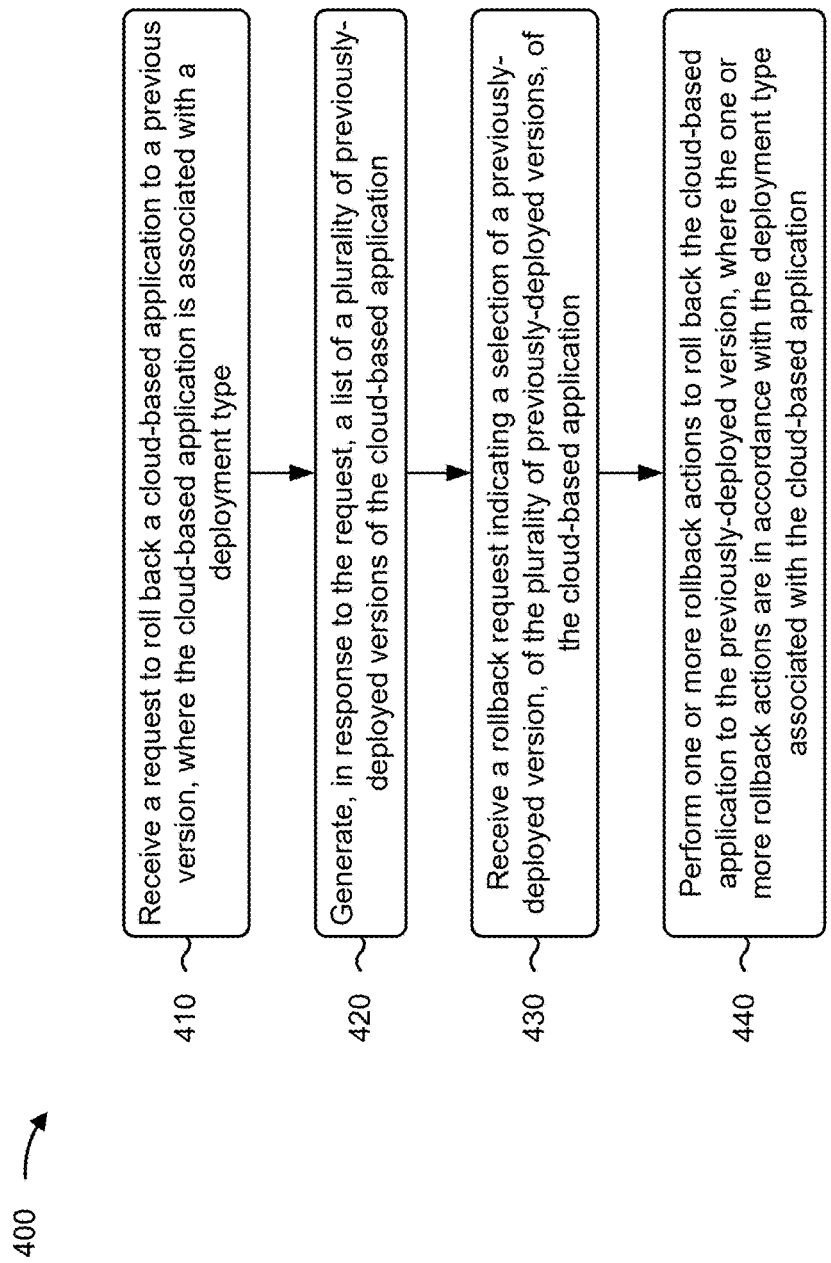
FIG. 4 is a flowchart of an example process associated with version rollback for cloud-based applications, in accordance with some embodiments of the present disclosure.

FIG. 4 is a flowchart of an example process 400 associated with version rollback for cloud-based applications. In some implementations, one or more process blocks of FIG. 4 may be performed by the rollback system 230. In some implementations, one or more process blocks of FIG. 4 may be performed by another device or a group of devices separate from or including the rollback system 230, such as the cloud computing system 202, the release management system 240, the data store 250, and/or the version control system 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request to roll back a cloud-based application to a previous version, where the cloud-based application is associated with a deployment type (block 410). For example, the rollback system 230 (e.g., using processor 320, memory 330, input component 340, and/or communication component 360) may receive a request to roll back a cloud-based application to a previous version, as described above in connection with reference number 105 of FIG. 1A. As an example, the request may be made by a user in response to an incident (e.g., a bug, an instability, a service interruption, or the like) affecting a currently-deployed version of the cloud-based application.

As further shown in FIG. 4, process 400 may include generating, in response to the request, a list of a plurality of previously-deployed versions of the cloud-based application (block 420). For example, the rollback system 230 (e.g., using processor 320 and/or memory 330) may generate, in response to the request, a list of a plurality of previously-deployed versions of the cloud-based application, as described above in connection with reference number 110 of FIG. 1B. In some examples, the list may be filtered, to remove from the list unstable previously-deployed versions.

As further shown in FIG. 4, process 400 may include receiving a rollback request indicating a selection of a previously-deployed version, of the plurality of previously-deployed versions, of the cloud-based application (block 430). For example, the rollback system 230 (e.g., using processor 320, memory 330, input component 340, and/or communication component 360) may receive a rollback request indicating a selection of a previously-deployed version, of the plurality of previously-deployed versions, of the cloud-based application, as described above in connection with reference number 115 of FIG. 1C. As an example, the selection may be made by a user via a user interface.

As further shown in FIG. 4, process 400 may include performing one or more rollback actions to roll back the cloud-based application to the previously-deployed version, where the one or more rollback actions are in accordance with the deployment type associated with the cloud-based application (block 440). For example, the rollback system 230 (e.g., using processor 320, memory 330, and/or communication component 360) may perform one or more rollback actions to roll back the cloud-based application to the previously-deployed version, as described above in connection with reference numbers 140, 145, and 150 of FIG. 1F, or reference number 155 of FIG. 1G. As an example, a first set of actions may be performed if the deployment type is a container deployment and a second set of actions may be performed if the deployment type is a serverless compute deployment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1G. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for version rollback for cloud-based applications, the system comprising:
one or more memories; and
one or more processors, communicatively coupled to the one or more memories, configured to:
receive a request, made via a user interface, to roll back a cloud-based application to a previous version, wherein the cloud-based application is associated with a deployment type;
generate, in response to the request and for presentation in the user interface, a list of a plurality of previously-deployed versions of the cloud-based application;
receive, via the user interface, a rollback request indicating a selection of a previously-deployed version, of the plurality of previously-deployed versions, of the cloud-based application;
iteratively scan, responsive to the deployment type being a container deployment, respective deployment specifications for a plurality of previous deployments of the cloud-based application to identify image versions referenced in the respective deployment specifications;
identify, while iteratively scanning, an inactive deployment specification, of the respective deployment specifications, that references an image version for the previously-deployed version of the cloud-based application;
generate a new deployment specification using a content of the inactive deployment specification; and
cause a deployment of the cloud-based application using the new deployment specification.

2. The system of claim 1, wherein the one or more processors are further configured to:
cause, responsive to the deployment type being a serverless compute deployment, remapping of an alias for the cloud-based application to the previously-deployed version of the cloud-based application.

3. The system of claim 1, wherein the one or more processors are further configured to: identify whether the deployment of the cloud-based application is in progress; and cause canceling of the deployment in order to cause a rollback to one of the plurality of previously-deployed versions of the cloud-based application.

4. The system of claim 1, wherein the one or more processors, to iteratively scan the respective deployment specifications, are configured to:
discontinue iteratively scanning the respective deployment specifications responsive to identifying the inactive deployment specification that references the image version.

5. The system of claim 1, wherein the container deployment uses user-managed compute resources.

6. The system of claim 1, wherein the container deployment uses service-managed compute resources.

7. The system of claim 1, wherein the content of the inactive deployment specification indicates the image version and at least one of:
a processor allocation,
a memory allocation,
a networking configuration,
an environment variable, or
a data volume.

8. The system of claim 1, wherein the one or more processors, to cause the deployment of the cloud-based application using the new deployment specification, are configured to:
cause concurrent stopping of all existing instances of the cloud-based application; and cause initiation of new instances of the cloud-based application using the new deployment specification.

9. The system of claim 1, wherein the one or more processors, to generate the list of the plurality of previously-deployed versions of the cloud-based application, are configured to:
filter the list, to remove from the list unstable versions of the plurality of previously-deployed versions.

10. The system of claim 1, wherein the cloud-based application is deployed in a cloud environment in which at least one additional cloud-based application is deployed, and
wherein the at least one additional cloud-based application is associated with a different deployment type than the deployment type associated with the cloud-based application.

11. A method of version rollback for cloud-based applications, comprising:
receiving a request to roll back a cloud-based application to a previous version;
generating, in response to the request, a list of a plurality of previously-deployed versions of the cloud-based application;
receiving a rollback request indicating a selection of a previously-deployed version, of the plurality of previously-deployed versions, of the cloud-based application;
identifying an inactive deployment specification, from among a plurality of deployment specifications for the cloud-based application, that references an image version for the previously-deployed version of the cloud-based application;
generating a new deployment specification using a content of the inactive deployment specification; and
causing a deployment of the cloud-based application using the new deployment specification.

12. The method of claim 11, further comprising:
identifying that the cloud-based application is associated with a container deployment,
wherein identifying the inactive deployment specification, generating the new deployment specification, and causing the deployment are responsive to identifying that the cloud-based application is associated with the container deployment.

13. The method of claim 11, wherein identifying the inactive deployment specification comprises:
iteratively scanning respective deployment specifications for a plurality of previous deployments of the cloud-based application to identify image versions referenced in the respective deployment specifications.

14. The method of claim 13, wherein iteratively scanning the respective deployment specifications comprises:
discontinuing iteratively scanning the respective deployment specifications responsive to identifying the image version for the previously-deployed version of the cloud-based application in the inactive deployment specification.

15. The method of claim 11, further comprising:
authenticating into an account with a cloud environment, wherein the cloud-based application is deployed in connection with the account.

16. The method of claim 11, wherein causing the deployment of the cloud-based application using the new deployment specification comprises:

causing concurrent stopping of all existing instances of the cloud-based application; and
causing initiation of new instances of the cloud-based application using the new deployment specification.

17. A non-transitory computer-readable medium storing a set of instructions for version rollback for cloud-based applications, the set of instructions comprising:
one or more instructions that, when executed by one or more processors of a device, cause the device to:
receive a request to roll back a cloud-based application to a previous version,
wherein the cloud-based application is associated with a deployment type;
generate, in response to the request, a list of a plurality of previously-deployed versions of the cloud-based application;
receive a rollback request indicating a selection of a previously-deployed version, of the plurality of previously-deployed versions, of the cloud-based application; and
perform one or more rollback actions to roll back the cloud-based application to the previously-deployed version,
wherein the one or more rollback actions are in accordance with the deployment type associated with the cloud-based application.

18. The non-transitory computer-readable medium of claim 17, wherein the deployment type is a container deployment, and
wherein the one or more instructions, that cause the device to perform the one or more rollback actions, cause the device to:
iteratively scan respective deployment specifications for a plurality of previous deployments of the cloud-based application to identify image versions referenced in the respective deployment specifications;
identify, while iteratively scanning, an inactive deployment specification, of the respective deployment specifications, that references an image version for the previously-deployed version of the cloud-based application;
generate a new deployment specification using a content of the inactive deployment specification; and
cause a deployment of the cloud-based application using the new deployment specification.

19. The non-transitory computer-readable medium of claim 18, wherein the one or more instructions, that cause the device to cause the deployment of the cloud-based application, cause the device to:
cause concurrent stopping of all existing instances of the cloud-based application; and
cause initiation of new instances of the cloud-based application using the new deployment specification.

20. The non-transitory computer-readable medium of claim 17, wherein the deployment type is a serverless compute deployment, and
wherein the one or more instructions, that cause the device to perform the one or more rollback actions, cause the device to:
cause remapping of an alias for the cloud-based application to the previously-deployed version of the cloud-based application.

* * * * *